(12) United States Patent
Farmar

(10) Patent No.: US 7,184,754 B1
(45) Date of Patent: Feb. 27, 2007

(54) METHOD AND APPARATUS FOR CELLULAR TELEPHONE DIRECTORY ASSISTANCE

(76) Inventor: Michael G. Farmar, 5210 Meaders La., Dallas, TX (US) 75229

(*) Notice: Subject to any disclaimer, the term of this patent is extended or adjusted under 35 U.S.C. 154(b) by 326 days.

(21) Appl. No.: 10/248,652

(22) Filed: Feb. 4, 2003

(51) Int. Cl.
H04M 3/42 (2006.01)

(52) U.S. Cl. .............................. 455/414.1; 379/218.01

(58) Field of Classification Search ............ 455/414.1, 455/411, 426, 432; 379/218.01; 707/6, 707/3, 9, 10
See application file for complete search history.

(56) References Cited

U.S. PATENT DOCUMENTS

| | | | |
|---|---|---|---|
| 4,868,848 A | 9/1989 | Magnusson et al. | 379/355 |
| 4,979,206 A | 12/1990 | Padden et al. | 379/67 |
| 5,509,058 A | 4/1996 | Sestak et al. | 379/201 |
| 5,579,519 A | 11/1996 | Pelletier | 395/705 |
| 5,737,700 A | 4/1998 | Cox et al. | 455/414 |
| 5,850,433 A | 12/1998 | Rondeau | 379/201 |
| 5,873,032 A | 2/1999 | Cox et al. | 455/414 |
| 5,966,437 A | 10/1999 | Cox et al. | 379/309 |
| 6,301,477 B1 | 10/2001 | Lennert et al. | 455/433 |
| 6,324,571 B1 | 11/2001 | Hacherl | 709/208 |
| 6,381,325 B1 | 4/2002 | Hanson | 379/218.01 |
| 6,396,920 B1 | 5/2002 | Cox et al. | 379/266.02 |
| 6,560,456 B1 * | 5/2003 | Lohtia et al. | 455/445 |
| 6,731,927 B1 * | 5/2004 | Stern et al. | 455/414.1 |
| 7,110,513 B2 * | 9/2006 | Halpern et al. | 379/115.03 |
| 2002/0029178 A1 * | 3/2002 | Wiederin et al. | 705/34 |
| 2002/0068551 A1 * | 6/2002 | Strunk et al. | 455/414 |
| 2004/0032937 A1 * | 2/2004 | Brady et al. | 379/115.03 |
| 2004/0032942 A1 * | 2/2004 | Halpern et al. | 379/219 |
| 2004/0203650 A1 * | 10/2004 | Halpern et al. | 455/414.1 |
| 2004/0214554 A1 * | 10/2004 | Binning et al. | 455/414.1 |

* cited by examiner

Primary Examiner—Creighton Smith
(74) Attorney, Agent, or Firm—Gardere Wynne Sewell LLP

(57) ABSTRACT

A directory assistance service for cellular telephone numbers, which may be used with the existing directory assistance infrastructure, queries an aggregated database of public cellular telephone listings for all cellular telephone service providers, queries each of the cellular service provider's directory services directly, or queries a proxy, which in turn queries each of the cellular service provider's databases.

5 Claims, 5 Drawing Sheets

METHOD AND APPARATUS FOR CELLULAR TELEPHONE DIRECTORY ASSISTANCE

BACKGROUND OF INVENTION

The present invention relates generally to the field of cellular systems, and more particularly to a system and method for cellular telephone directory assistance.

By industry convention, cellular telephone numbers are generally kept private and not listed. Directory assistance services are generally not available for obtaining cellular telephone numbers. This approach was taken by the industry because a subscriber receiving any call may be charged for the airtime of the incoming call, or the airtime for the incoming call would be deducted from a monthly airtime allotment.

SUMMARY OF INVENTION

The invention recognizes the increase in the number of cellular telephone subscribers and the decrease in rates have reduced the traditional reluctance to public listing of cellular telephone numbers and, indeed, that many cellular telephone subscribers may prefer to have their cellular telephone numbers available through directory services. It further recognizes that cellular telephone service is displacing landline telephone service thereby creating a need for cellular telephone directory assistance.

However, there is presently no infrastructure for making cellular telephone numbers available to directory services due, in part, to the assumption that such numbers would always remain unlisted. The major cellular service providers offer nationwide service and each cellular service provider has sufficient records for creating public listings of their subscribers. Simply knowing where a cellular telephone service subscriber lives is not sufficient for determining which service provider's database to check to obtain that subscriber's number.

Various aspects of the invention, described below in connection with several exemplary embodiments, are directed to enabling a provision of comprehensive directory assistance services for cellular telephone numbers.

DETAILED DESCRIPTION

Figure 1:
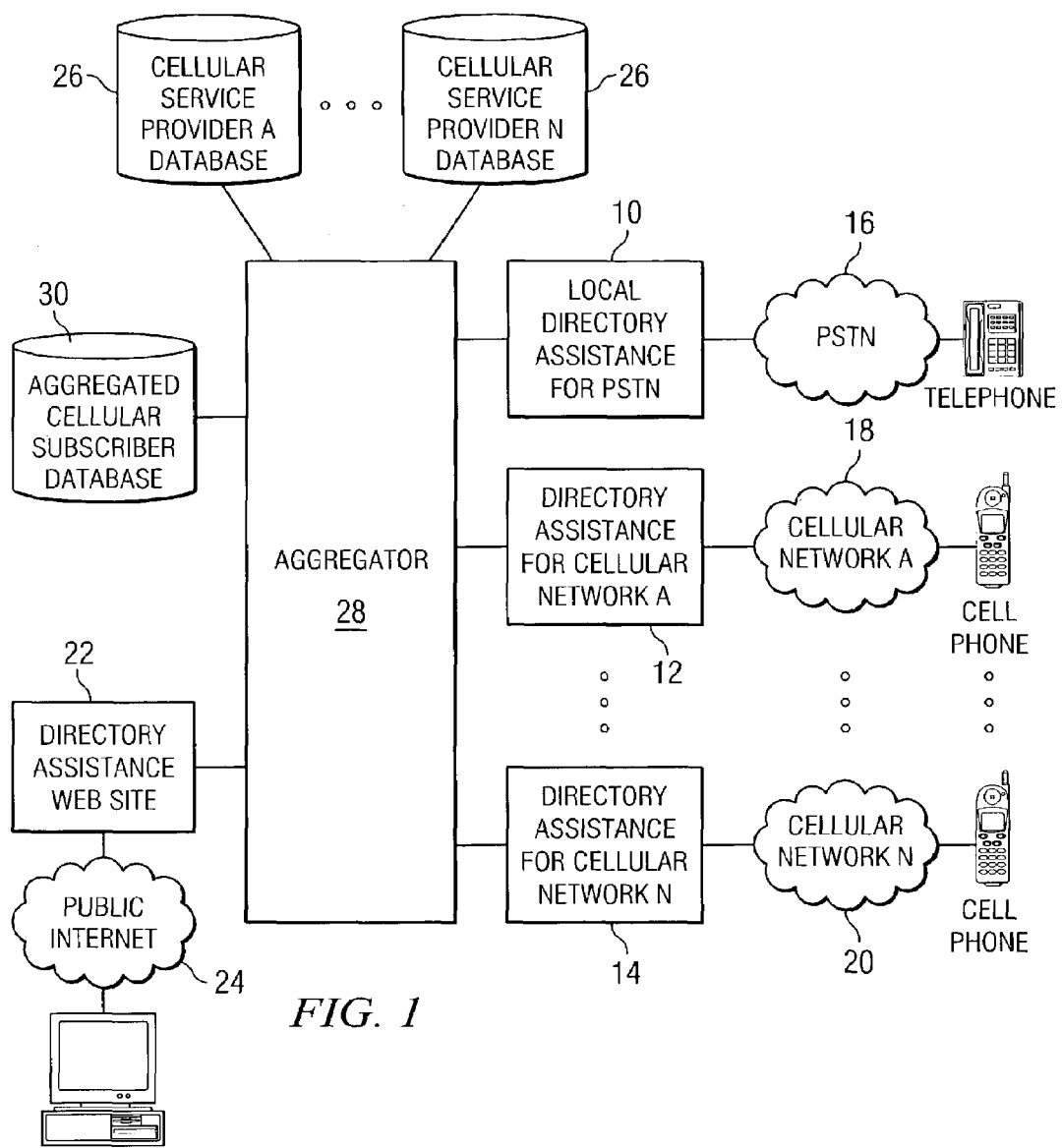
FIG. 1 is a block diagram of a first example of a system for providing cellular telephone directory assistance.

In one example of a method and apparatus for providing directory services for cellular telephone numbers, subscriber information from databases of a plurality of cellular telephone service providers is aggregated or collected into at least one aggregated database. The aggregated database may include multiple files and exist in multiple instances. A directory assistance service provider, a cellular telephone service provider, or an aggregation service may maintain the aggregated database or make it available for access. The database is preferably updated on a regular basis, such as once a day. When a directory assistance service—which can be automated or operator-assisted—receives a request for a cellular telephone number from a user, the directory assistance service provider queries the aggregated database. It is preferable for the service requester to specify the service, whether conventional or cellular. If either type of number is requested, it may also before, after, or at the same time query conventional directory assistance databases that it or third party services maintain. Matching results are returned to the directory assistance service provider. If there is more than one result, the directory assistance service may seek additional information from the party requesting the directory information to resolve the correct result. If desired and approved, the directory assistance service provider may also store, generally on a temporary basis, the number along with related information in a local database.

In another example of a method and apparatus for providing directory services for cellular telephone numbers, a directory assistance service either directly or indirectly, through for example a search facility, queries databases of individual cellular service providers in response to receiving a request for a cellular telephone number. Preferably, all possible providers are queried based on the information given by the requester to ensure that all listings for all possible matches are found. Although a subscriber may have an address in an area serviced only by certain providers, it is preferable not to assume that an individual has subscribed to one of those services, especially given the nationwide roaming and calling offered by many service plans.

In either example, routing of a call seeking directory assistance for a cellular telephone number can still be handled by the existing directory services infrastructure, and thus has an advantage of not requiring a change in the current structures. Directory services that may use either example include directory services offered to public telephone and cellular telephone network subscribers, as well as services that may be accessed through the public and private data networks, such as the Internet. Arrangements with individual wireless carriers will permit real-time access or, in the example of the aggregated database, on a regular basis. To compensate cellular service providers, they may receive a fee based on the number of times its data is accessed by directory service providers or based on other criteria. The aggregated database may be a cooperative effort involving multiple cellular service providers, each of which agrees to provide subscriber information in exchange for receiving access for their respective directory services. There are no geographic limits to either example. Each could be used in a region, throughout a country, or throughout the world.

Figure 2:
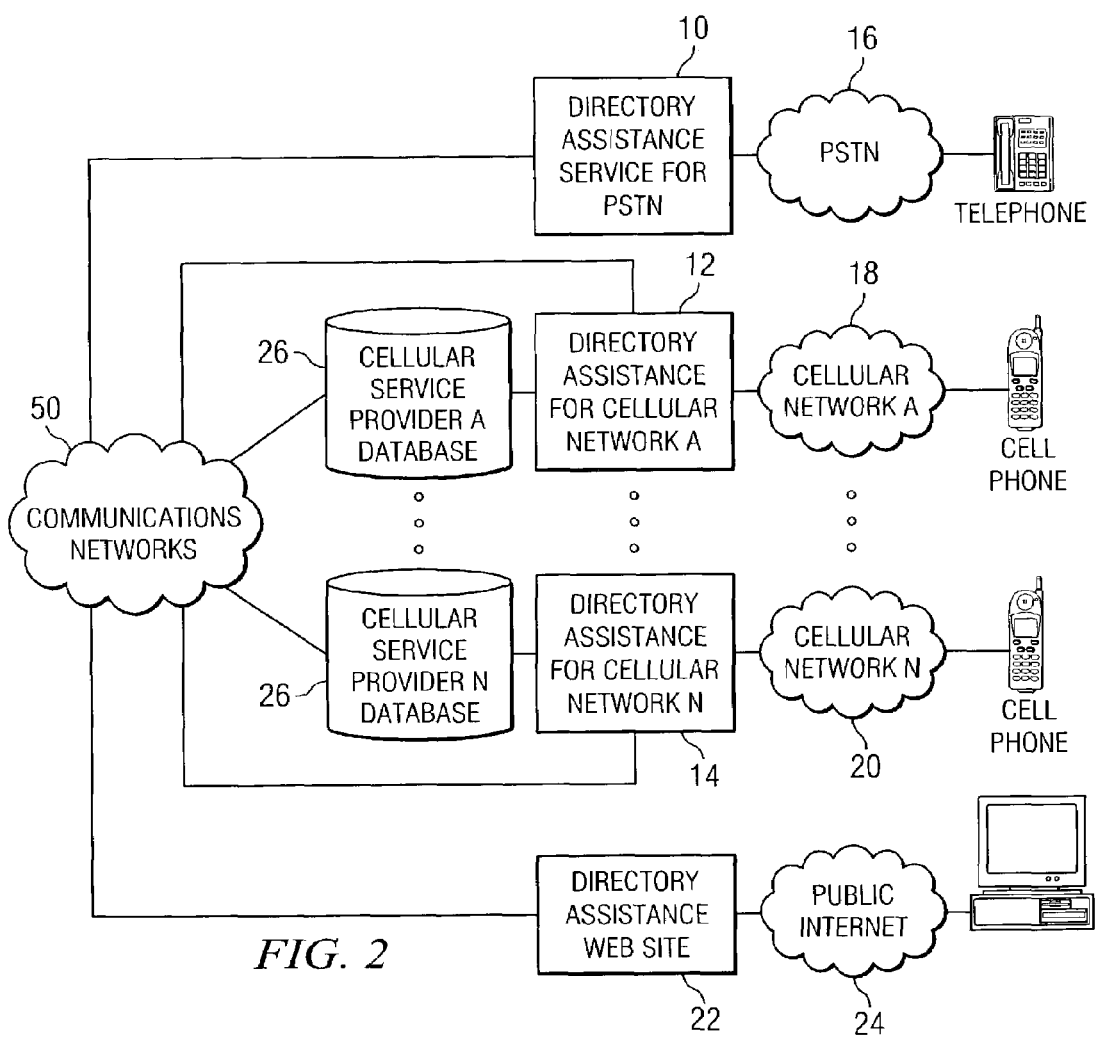
FIG. 2 is a block diagram of a second example of a system for providing cellular telephone directory assistance.
Figure 3:
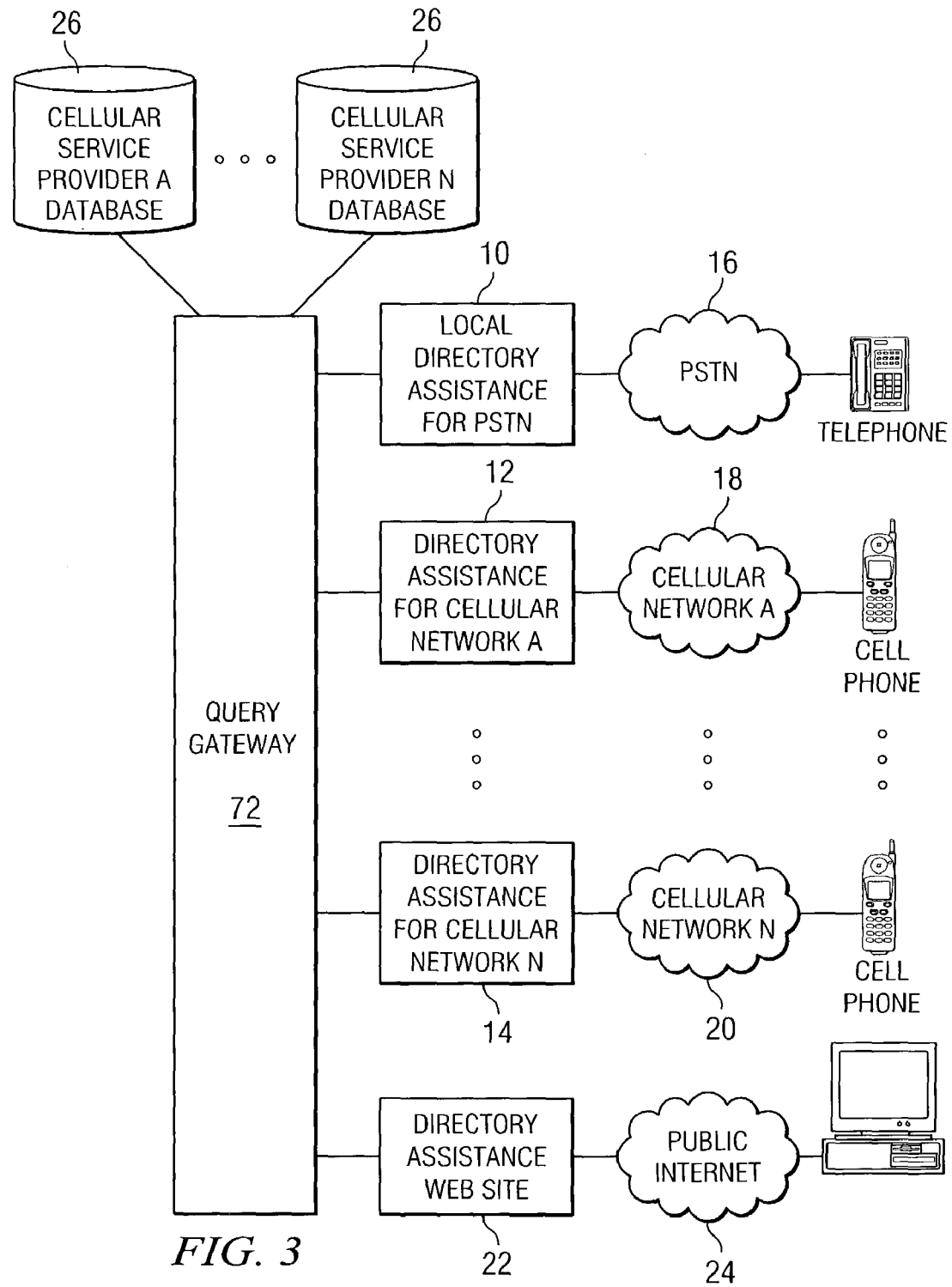
FIG. 3 is a block diagram of a third embodiment of a system for providing cellular telephone directory assistance.

FIGS. 1, 2 and 3 illustrate three representative examples of the provision of directory assistance services for cellular telephone numbers. In each of the examples, directory service providers may be accessed from any type of communication device, through any type of access network. Directory assistance services 10, 12 and 14 are representative examples of, respectively a conventional local directory service for a public switched telephone network (PSTN) 16 and two different cellular telephone networks 18 and 20. These services may use automated voice response systems, operators, or a combination of the two and primarily interact with someone using speech. Directory assistance web site 22 is an example of data based directory service that exchanges information with a customer primarily using data instead of speech or voice. The web site is, in this example, available through the public Internet. However, directory services for any type of network could interact with users by voice and data. For example, the web site 22 may receive text-based or voice-based service requests over the public Internet 24. These examples are not intended to limit in any way the type of device, access or manner of access to directory services that may be practiced with the invention.

In each of the examples, it is contemplated that there are a plurality of representative cellular service providers, referred to as cellular service providers A to N. Each cellular service provider maintains a database 26 (or a collection of databases) containing cellular telephone numbers and subscriber identifying information, such as name and address. These databases are either created specifically for listing purposes or for other purposes, including for example billing and customer assistance.

Referring now to the example of FIG. 1, an aggregator or aggregation service 28 creates aggregated cellular subscriber database 30 using information contained in databases 26 of the cellular service providers. The aggregated cellular subscriber database 30 may be comprised of multiple files or databases, and may be distributed or exist in multiple instances. Alternately, rather than a centralized aggregator service, a provider of directory assistance services may itself create an aggregated cellular subscriber database. The aggregated cellular telephone database would include at a minimum, for example, the name, address and cellular telephone number of cellular subscribers who have permitted their cellular telephone numbers to be listed. The database preferably also includes information that associates each listing or record with a particular cellular service provider, not only for purposes of keeping the listing updated but also for purposes of tracking when a cellular telephone number in the cellular service provider's network is accessed. This information may then be used in connection with determining payments between the aggregator and the cellular service providers. For example, the aggregator may pay the cellular service provider for access to its information based on the number of times that the provider's information is accessed for use in the aggregated cellular subscriber database.

The aggregated cellular telephone database is preferably kept current through periodic updates received from the cellular service providers. Updates may be obtained every 24 hours, for example. The lines extending between the aggregator 28 and the databases 26 signify data flow. Any method may be used to transmit or communicate updates, though it is preferable to use a communication network so that changes in databases 26 can be reflected relatively quickly in aggregated cellular telephone database 30.

Directory assistance services, such as directory assistance services 10, 12, 14 and 22, access the aggregated cellular database 30 whenever a request for a cellular telephone number is received. The lines extending between aggregator 28 and the directory service providers indicate only data flow or communication. No particular communication system needs to be used, though the communication networks over which the data is transmitted should preferably provide a high quality of service acceptable for a high volume of real time database queries. The aggregator may charge the directory assistance services on a per query basis or other basis.

Figure 4:
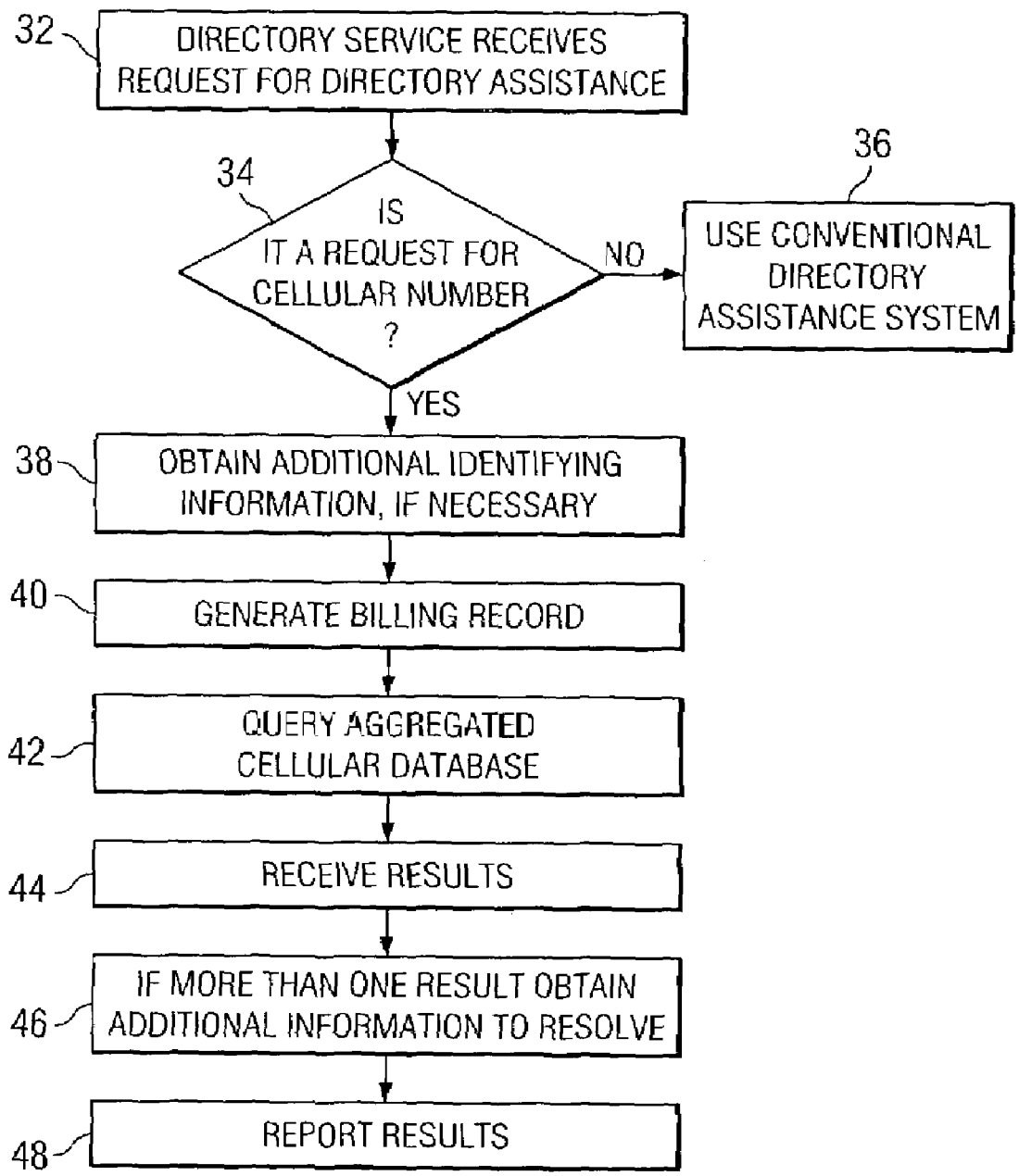
FIG. 4 is a flow chart of a method for providing cellular telephone directory assistance in accordance with the example of FIG. 1.

FIG. 4 is a flow diagram illustrating the basic steps of a process that a directory service provider might follow in the example of FIG. 1. As indicated by steps 32, 34 and 36, a directory service provider who receives a request for directory assistance may determine initially whether it is a request for a cellular number. If not, it uses whatever directory service systems it may then currently use. Otherwise, it starts to process the request by seeking any additional information at step 38. In a voice-based system, such as those that use automated voice response units (VRU) or live operators, this step may ask the requester for name, city and state of the cellular service subscriber for whom they are seeking a cellular telephone number. A billing record is generated at step 40 for billing for the service. A query is sent at step 42 to obtain from the aggregated cellular telephone number database 30 any matching records. Results from the query are received at step 44. If necessary steps 42 and 44 can be repeated. If more than one record or listing is returned, the directory service provider may seek additional information from the requesting party at step 46 to resolve the request and to report the cellular telephone number at step 48, if one is found. Alternately, it may simply report all of the found records at step 48.

Referring to the example of FIG. 2, no aggregator is used. Rather, each directory assistance service 10, 12, 14 and 22, queries the cellular service provider databases 26 directly, in real time. Each cellular service database 26 is queried. No particular type of communications network needs to be used. Communication networks 50 are representative of all suitable communications networks. Directory assistance services 12 and 14 for cellular networks 18 and 20 may optionally query their own databases without having to query the other cellular provider databases.

Figure 5:
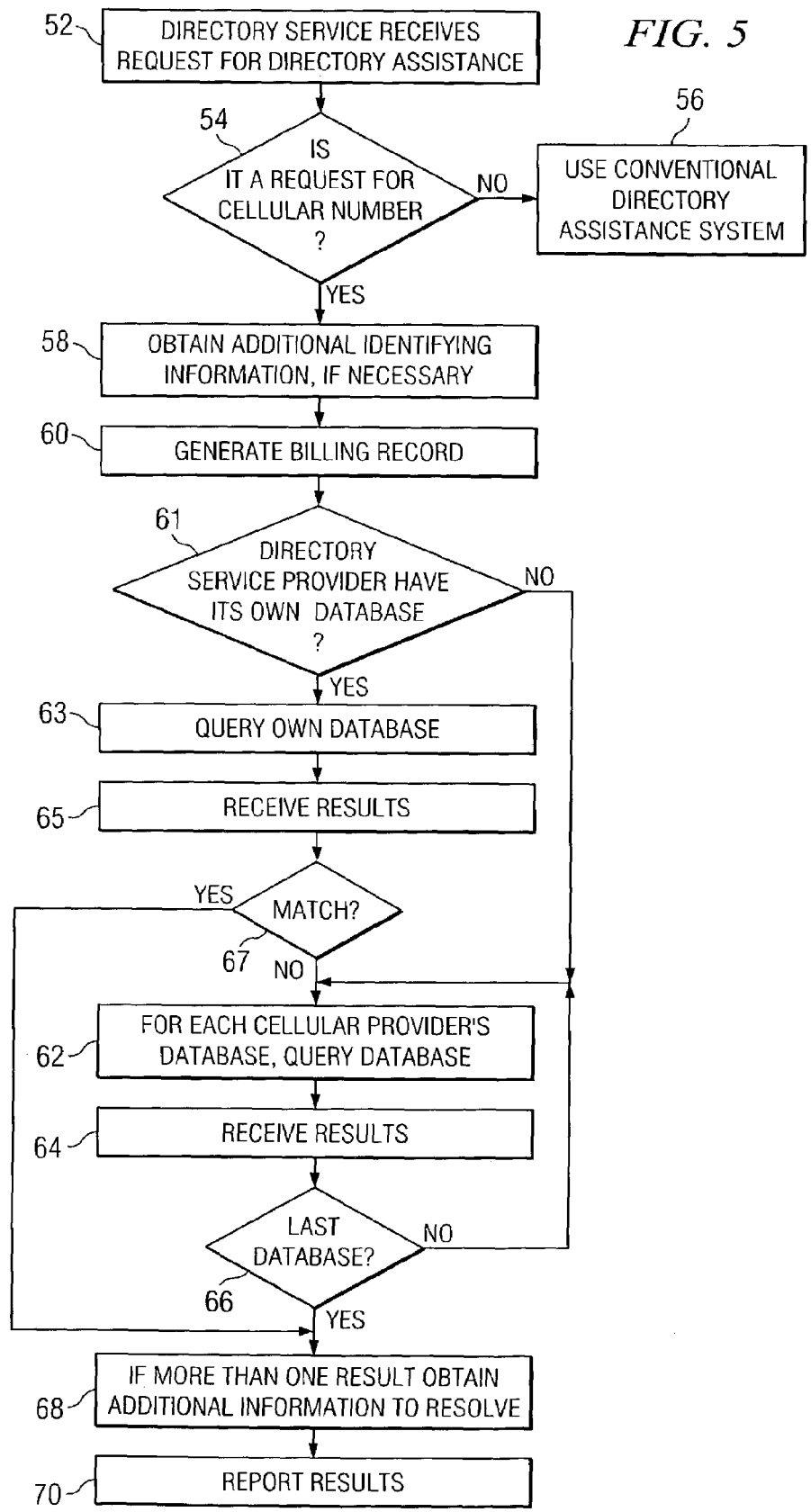
FIG. 5 is a flow chart of a method for providing cellular telephone directory assistance in accordance with a second example of FIG. 2.

FIG. 5 is a flow chart showing basic steps that a directory service provider in the example of FIG. 2 would perform in response to receiving a request for directory assistance. Steps 52 to 60 are the same as steps 32 to 40 of FIG. 4. Steps 61, 62, 63, 64, 65, 66, and 67 represent the steps of querying each cellular service provider database 26 including the directory service provider's own database, if it exists and is available, and storing the results of those queries. If more than one record is found, additional information to determine the appropriate listing may be sought from the requesting party at step 68. The cellular service provider databases may, for example, simply report the number of matching queries. If more than one record matches, additional information received from the requester may be used to reduce the number of matches before returning the complete records at step 68 and reporting any results at step 70. Alternately, all matching records may be reported at step 70.

Referring now to FIG. 3, in a third example of a cellular telephone number directory assistance system, an aggregated database is not used. Nor do the directory assistance service providers query each of the cellular service provider databases 26. Rather, a query gateway 72 is used. A directory assistance provider, such as providers 10, 12, 14 and 22, need send only a single query to the query gateway. The gateway in turn queries cellular service provider databases 26. This arrangement reduces the burden on the directory service providers and the communication networks used by them to make the queries. Furthermore, the query gateway need not be burdened with maintaining an aggregated database. It may also employ caching and other techniques to speed up or reduce the number of queries to the cellular service provider databases. It may also track queries from directory assistance service providers for purposes of charging them and counting requested cellular telephone numbers for purposes of compensating cellular service providers.

What is claimed is:

1. Apparatus for providing cellular telephone directory information, comprising means for providing directory assistance services and means for querying, in response to a request for a cellular telephone number listing, each of a plurality of databases maintained by a different one of a plurality of cellular service providers for records relevant to the request.

2. The apparatus of claim 1, further comprising means for tracking the number of times listing information from each of the plurality of cellular service providers is provided in response to a query from the directory assistance service.

3. A method for facilitating directory assistance services, comprising:
- aggregating into a database system cellular listing information from each of a plurality of cellular telephone service providers, the listing information including telephone numbers and subscriber identifying information;
- receiving from a directory assistance service a query for a cellular telephone number listing and, in response thereto, providing information from the database system matching the query;
- regularly updating the database system with changes to the listing information made by each of the plurality of cellular service providers; and
- storing information on the number of times cellular telephone listings of each of the plurality of subscribers is provided in response to a query from the directory assistance service; and
- compensating each of the plurality of cellular service providers for receiving the listing information at least in part based on the number of times listing information from each of the plurality of cellular service providers is provided in response to a query from the directory assistance service.

4. A method for providing directory assistance for cellular telephone numbers, comprising:
- receiving a request for directory assistance;
- determining whether the request is for a cellular telephone number; and
- if the request is for a cellular telephone number, querying at least one database containing cellular telephone numbers and a subscriber identifying information for each of a plurality of service providers;
- storing information on the number of times cellular telephone listings of each of the plurality of subscribers is provided in response to a query from the directory assistance service; and
- compensating each of the plurality of cellular service providers for receiving the listing information at least in part based on the number of times listing information from each of the plurality of cellular service providers is provided in response to a query from the directory assistance service.

5. A method for providing directory assistance for cellular telephone numbers, comprising:
- receiving a request for directory assistance;
- determining whether the request is for a cellular telephone number; and
- if the request is for a cellular telephone number, querying each of a plurality of databases maintained by cellular telephone service providers containing cellular telephone numbers and a subscriber identifying information; and
- compensating each of the plurality of cellular service providers for receiving listing information at least in part based on the number of times listing information from each of the plurality of cellular service providers is provided in response to a query for listing information.

* * * * *